June 27, 1933.  S. WISE  1,915,564
ATTACHING DEVICE FOR SPARE WHEELS
Filed Oct. 15, 1931   2 Sheets-Sheet 1
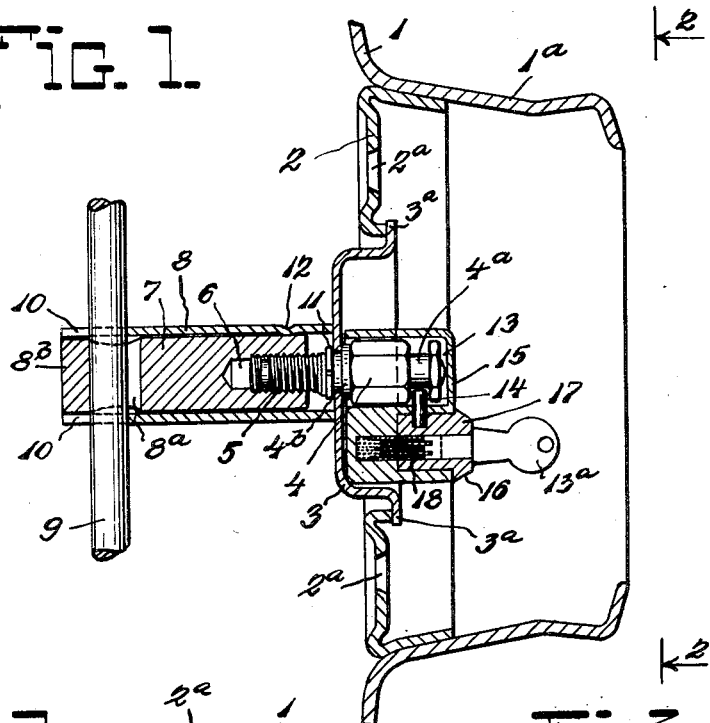
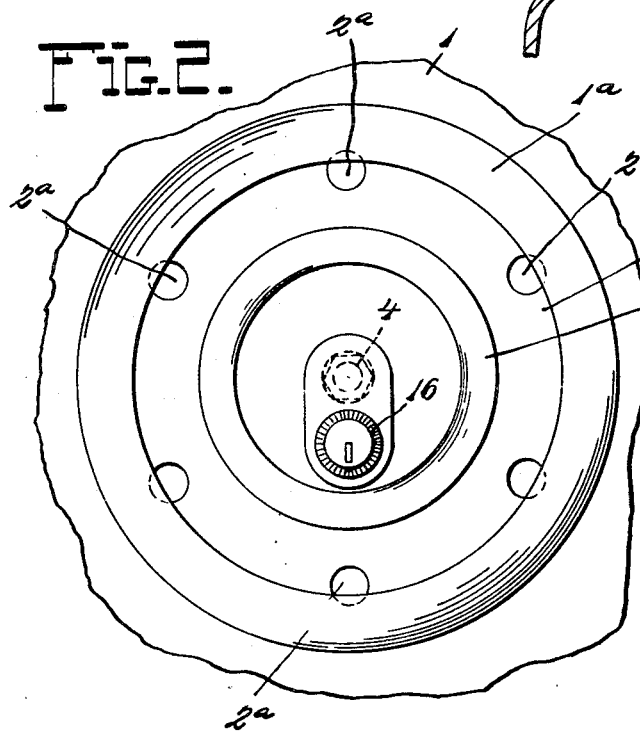
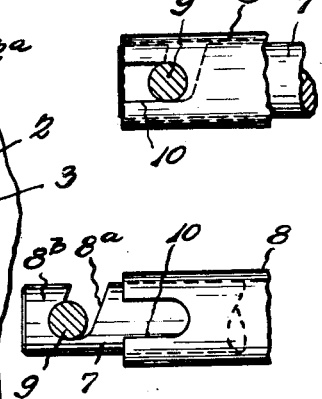
Inventor
SOLOMON WISE.
By Robert Robb
Attorneys June 27, 1933.  S. WISE  1,915,564
ATTACHING DEVICE FOR SPARE WHEELS
Filed Oct. 15, 1931  2 Sheets-Sheet 2
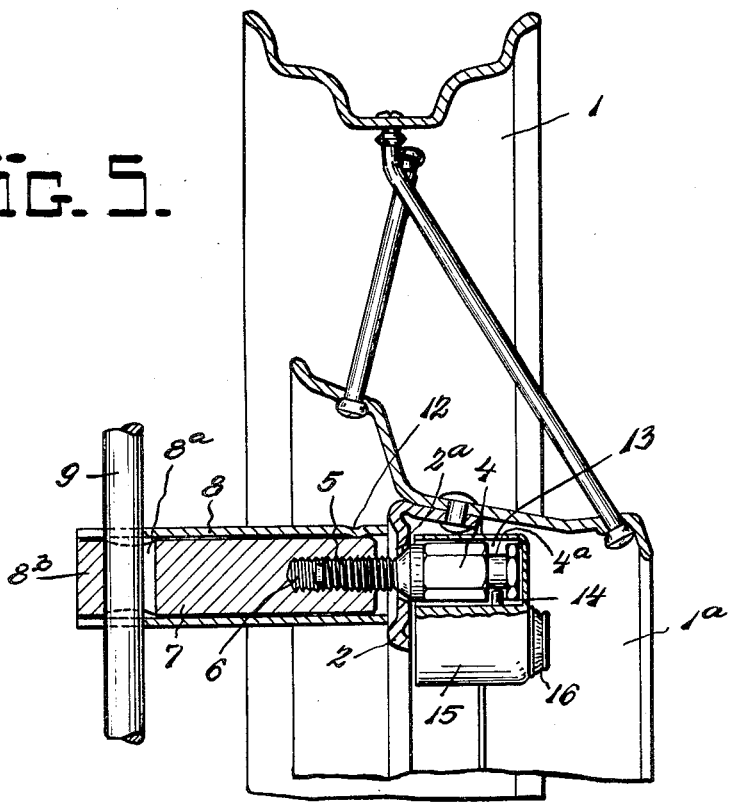
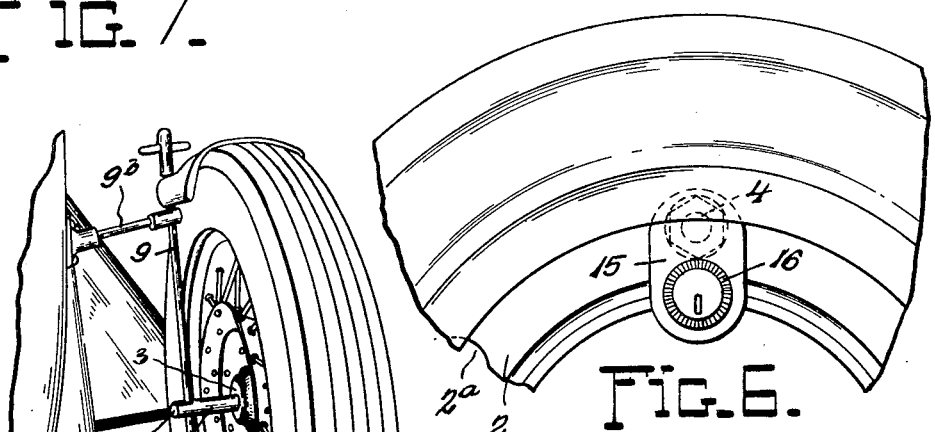
Inventor
SOLOMON WISE.
By
Attorneys Patented June 27, 1933

1,915,564

UNITED STATES PATENT OFFICE

SOLOMON WISE, OF SHAKER HEIGHTS, OHIO

ATTACHING DEVICE FOR SPARE WHEELS

Application filed October 15, 1931. Serial No. 569,064.

This invention aims primarily to provide a novel design of simple attaching device or devices for use in connection with the locking of spare wheels for automobiles, and principally such spare wheels as are mounted in fender wells of the car. The invention proposes a lock device for the purpose mentioned, designed to cooperate with fixed means attached to the car or automobile, the device comprising detachable locking and attaching parts directly coacting with the spare wheel itself in such a manner that when the detachable parts are removed, and only then, the spare wheel may be unseated from the well of the fender and put into use or handled as desired. The fixed part of the vehicle with which the locking and attaching means of the invention cooperates usually consists of a rod fixedly mounted on the side of the vehicle and said parts of the attaching device of the present invention are adapted to engage this rod with a vise-like gripping action, rendering the lock means highly efficient for its purposes.

A subsidiary feature of the invention lies in simple provisions utilized by which the parts of the lock device that cooperate with the said fixed part or rod will not be displaced one from the other when the lock itself has been removed to admit of the detachment of the spare wheel from the vehicle. There is no liability by the use of the present invention of the parts of the entire device that remain upon the rod after removal of the spare wheel becoming separated from each other as by dropping away, one from the other, a disadvantage of prior devices. Ofttimes one of these parts as heretofore used will drop in the dirt alongside of the machine under the conditions stated and this is obviously undesirable.

Another object of the invention has been to so design the locking device thereof that it may be used, so far as its main parts are concerned, in different ways in association with the spare wheel that is to be locked thereby. In other words, a certain wheel attaching bolt part of the device which is utilized under all conditions in carrying out the invention may be employed to hold the spare wheel in place by passing through one of the apertures of the bolt or hub flange of the spare wheel, and inter-engaging with the rod-gripping members that are normally located at the inner side of said flange when the device is applied in the manner stated. Or again, the said wheel attaching bolt may be provided with a swivelled or rotatively mounted cup member adapted to be received by the central opening of the spare wheel which is surrounded by the hub flange, and to engage the innermost portion of the hub flange with a clamping action caused by the screwing of the wheel attaching bolt to an attaching bar that directly engages the fixed rod previously referred to with a vise-like action. This alternative construction is highly desirable because the cup-member affords a finished appearance as a part which closes the central opening of the spare wheel, and there are advantages, therefore, in the use of the last described construction.

With the foregoing especial features of the invention in view, other detailed features of the construction of my lock device will be presented as the complete construction is described hereinafter, with reference to the accompanying drawings, in which—

Figure 1 illustrates one of the preferred embodiments of the invention wherein the attaching device is equipped with the cup-like hub flange clamping part that closes the hub opening of the spare wheel. The view is sectional and partially fragmentary.

Figure 2 is a view in elevation, looking from the right, as the parts are shown in Figure 1, the key being omitted.

Figure 3 is a fragmentary view showing the fixed rod of the car in section and illustrating primarily the engaging jaw carried by the lock bar, and the sleeve that normally houses said lock bar.

Figure 4 is a view similar to Figure 3, showing the same parts essentially, but illustrating the manner of movement of the attaching bar and sleeve when assembling the parts or detaching them.

Figure 5 is a view showing the rim of the spare wheel and its hub structure in a somewhat fragmentary sectional manner and illustrating the application of my invention as when the wheel attaching bolt is passed through one of the bolt openings of the hub flange of the wheel, the cup-like clamping member illustrated in Figure 1 being omitted in this modification of my invention.

Figure 6 is a fragmentary perspective view that brings out more clearly the appearance of the lock device of Figure 5 construction, looking from the outside of the spare wheel, and Figure 7 is a perspective view that discloses more clearly the arrangement of the parts of the spare wheel and car carrying the same when the lock device of the type of Figures 1 and 2 construction is employed.

Setting forth in detail the parts of my invention, the drawings may be referred to. In the construction illustrated in Figures 1 and 2 of said drawings, 1 denotes the portion of the spare wheel illustrated to show the application of the invention, and particularly the rim of the wheel, 1a denoting the hub portion of the wheel, and 2 the hub flange which is formed with the usual apertures 2a through which the clamping bolts for attaching the spare wheel in operative position on the axle parts are passed.

The attaching device of this invention is very simple, being composed of relatively few parts, including the wheel attaching bolt 4 having a suitable nut head at its outer side for the application of a wrench thereto. The bolt 4 is equipped at its head portion with a locking groove 4a and at its inner portion said bolt is threaded as at 5 to enter a threaded opening or recess in the outer portion of the lock bar 7, the innermost portion of said threaded opening being designated 6. The attaching bar 7 is disposed within a sleeve or casing member 8 preferably of cylindrical form, though this is immaterial, and the bar 7 fits slidably within said sleeve. At its inner end portion the bar 7 is formed with a recess 8a, which virtually forms the inner extremity of the bar into a jaw 8b, and this jaw is capable of engaging the approximately vertical rod 9 fixed at its lower end to the fender as shown at 9a and connected at its upper end to a bracket arm 9b projecting from the side of the car. The recess 8a serves also as an interlocking means for the bar and rod. The rod 9 and its mode of attachment to the car are quite commonly known to those versed in the art.

Carried by the wheel attaching bolt 4 is the cup-like clamping member 3 which is in approximately the form of a disc with a central body depression, and the edges of the said disc are adapted to abut with the innermost portion of the hub flange 2a as shown at 3a. The clamping member 3 virtually fills the entire hub opening of the wheel, affords a finished appearance to the locking device at the place where it is mounted to coact with the wheel, and is advantageously used as will later appear, to cooperate with the other lock parts. This member 3 is rotatively or swivelly carried by the bolt 4, the latter having a shoulder 4b abutting the outer side of the member 3, and the bolt also having an annular groove in which is mounted a snap-ring 11 that permanently connects the member 3 with the bolt so as to prevent displacement.

To facilitate its cooperation with the rod 9 and the lock bar 7, the sleeve or casing member 8 is notched as shown at 10 in Figure 4 and Figure 3, the notches being adapted to receive the rod 9 and engage at their innermost portion with a side of the rod. Additionally, in order that the casing member or sleeve 8 may not become accidentally displaced from the bar 7 when the wheel attaching bolt 4 and clamping member 3 have been removed along with the said locking parts, I provide one or more friction lugs 12 formed by indenting a wall of the part 8 inwardly so that the lug is bound to frictionally engage with the member 7 when the parts are assembled as shown in Figure 1.

Engageable over the nut portion of the bolt 4 for preventing access to said nut portion to unscrew the same, is a hollow enclosing portion 13 of a detachable lock unit 15, which comprises said hollow enclosing portion and key operated mechanism also suitably enclosed, and including a locking pin 14 rotative under the control of the key so as to be disengaged from within the groove 4a of the nut portion of the bolt 4. The lock mechanism of the unit 15 is not material to the present invention so long as it places under control the pin 14 so that when it is desired to unlock the spare wheel, this pin may be disengaged from the bolt 4 permitting the unit 15 to be bodily detached.

The tumbler mechanism of the lock unit may be of any suitable type. An example of one such mechanism is disclosed by my Letters Patent No. 1,390,222, issued September 6, 1921.

With the construction of the parts of my device as set forth in respect to Figures 1 and 2 of the drawings, the modification of such construction as employed in Figures 5 and 6 will be self-evident. There are used in the construction of Figures 5 and 6 certain of the same parts as are used in the first described construction, and such parts are designated by the same reference characters. However, it is intended in the modification now being set forth that the wheel attaching bolt 4 shall be passed through any suitable one of the apertures in the hub flange 2. Under these conditions it is of course unnecessary to employ the clamping member 3 previously described as occupying the space of the hub opening of the flange 2, see Figures 1 and 2. As the construction is intended in Figures 5 and 6 therefore, the sleeve 8 simply abuts at its outer end against the adjacent portion of the flange 2 and these parts are directly clamped together in the action of the locking device as hereinafter set forth.

The operation of my invention will now be set forth as follows:

Under conditions of use the attaching parts which are associated with the rod 9 are assembled first by engaging the locking bar 7 at its recessed portion 8a with the rod 9 as seen in Figures 1, 3, and 4, or Figure 5. The sleeve 8 is assembled so that it extends over and houses the locking bar 7 and has its notched portions 10 receiving the rod 9. The parts 7 and 8 are frictionally engaged with one another by means of the friction projection 12 previously described. In order to lock the spare wheel in position according to the device of Figures 1 and 2, the wheel attaching bolt 4, with the clamping member 3 assembled thereon as a permanent adjunct thereof, is screwed into the opening 6 of the attaching bar 7. This causes clamping of the member 3 against the hub flange of the spare wheel 1 and the bolt 4 is screwed fairly tight, causing firm impingement between the parts 8 and 3 and drawing on the attaching bar 7, causing it to engage the rod 9 with a vise-like action which will be self-evident. The bolt 4 having been screwed tightly in place, the lock unit 15 is next mounted so that its hollow portion 13 engages over and encloses the nut head of the bolt, whereupon by the fingers engaging the knurled finger-piece 16 of the lock mechanism in the unit 15, the locking pin 14 is turned or snapped into engagement with the groove 4a of the bolt 4. The spare wheel is now firmly locked from unauthorized removal, because access cannot be had to the nut head of the bolt 4 or to the bolt itself in any way.

Suppose it be desired to remove the spare wheel. First the key 13a is introduced in the locking mechanism of the unit 15 and turned in order to disengage the pin 14 from the groove 4a. Thereupon the lock unit 15 is bodily removed, exposing the head of the bolt 4. By the use of a wrench, the bolt 4 is unscrewed and the parts 4 and 3 detached. The spare wheel is thus released entirely and may be lifted out of the fender well in an obvious manner. When the spare wheel is removed, the parts 7 and 8 remain in their position carried by the rod 9. Moreover, the part 8 cannot be accidentally displaced, or displace itself from the bar 7 because of the engagement of the friction projection or lug 12 of the sleeve 8 with respect to the bar 7.

So far as the use of the parts shown in the modification of Figures 5 and 6 is concerned, the operations of applying and removing the bolt 4 and unit 15 are identical with those previously set forth. The only difference in the arrangement is that the bolt is engaged or disengaged relatively to the bolt aperture of the hub flange and the sleeve or casing member 8 impinges the inner side of the hub flange instead of cooperating with a clamping member such as designated 3 in the constructions of Figures 1 and 2.

The locking mechanism of the unit 15 is of a known type including a key barrel 17 that carries the locking pin 14, concentric cylinders 18 normally preventing rotation of the barrel 17, springs to push the cylinders across the line of cleavage of the inner end of the barrel 17, and the key 13a that presses the cylinders to force their ends to the said line and thus release the barrel for turning it with the pin 14.

The clamping plate 3 is a novel expedient not heretofore proposed. It is advantageously used because it is not necessary to turn the wheel in the fender well to apply the attaching and lock means of the invention, an action required when the construction of Figures 5 and 6 is employed. Also the plate or member 3 keeps dirt, gravel, and foreign matter from passing through to the inner side of the wheel and dropping into the fender well. Again the member 3 gives a finished appearance to the lock device, as is obvious.

The member 8 reinforces the jaw of the member 7 against breakage.

Having thus described my invention, what I claim as new and desire to secure by Letters Patent of the United States, is—

1. An attaching device for spare wheels of automobiles, comprising an attaching bar having means to engage a rod fixed to the automobile and to interlock with the rod, a casing member enclosing said attaching bar, a spare wheel attaching member inter-engaging the attaching bar and comprising a head by which it may be removed and attached, the head being adapted to receive thereover a lock unit after it has fastened the wheel to the attaching bar, for controlling access to the head of the attaching member.

2. An attaching device for spare wheels of automobiles, comprising an attaching bar to engage a rod fastened to the automobile, a casing member enclosing said bar and having a bearing to engage said rod, a wheel attaching bolt adapted to be screwed into the locking bar and to engage and attach a spare wheel thereto, said bolt comprising a nut head, adapted to receive thereover a lock unit for preventing access thereto and removal of the bolt by the manipulation thereof.

3. An attaching device for spare wheels of automobiles, comprising an attaching bar provided with a recess to receive a rod fastened to the automobile, a casing member enclosing said bar and having a bearing to engage said rod and to clamp the rod to the bar, a wheel attaching bolt adapted to be screwed into the attaching bar and to engage and attach a spare wheel thereto, said bolt comprising a nut head having a groove therein and adapted to receive thereover, a lock unit for preventing access thereto and removal of the bolt by the manipulation thereof.

4. An attaching device for spare wheels of automobiles, comprising an attaching bar having at its inner end a jaw member to engage with a rod attached to the automobile, a casing member receiving therein the attaching bar and also adapted to engage said rod, a wheel attaching bolt screwed into the outer end of the attaching bar and removable therefrom and comprising a head, the head of said bolt having a circumferential groove therein, and adapted to receive thereover a lock unit associated with the head of the bolt for preventing access thereto and removal of the bolt by the manipulation thereof.

5. An attaching device for spare wheels of automobiles, comprising an attaching bar to engage a rod fixed to the automobile, a casing member enclosing said attaching bar, a spare wheel attaching member inter-engaging the attaching bar and comprising a head by which it may be removed and attached, and adapted to receive thereover a lock unit after the head has fastened the wheel to the attaching bar, for controlling access to the head of the attaching member, and a clamping member mounted upon the wheel attaching member and adapted to engage the hub flange of a spare wheel when the wheel attaching member is applied to the attaching bar.

6. An attaching device for spare wheels of automobiles, comprising an attaching bar provided with a recess for receiving a rod fixed to the automobile, a casing member enclosing said attaching bar, and provided with a notched portion adapted to receive the rod and to cooperate with the recess of the attaching bar, a spare wheel attaching member inter-engaging the attaching bar and comprising a head by which it may be removed and attached, and provided with means whereby attaching of the spare wheel attaching member to the said attaching bar actuates the said bar and casing member to enable them to clamp the said rod, the head being adapted to receive thereover a lock unit after the head has fastened the wheel to the attaching bar, for controlling access to the head of the attaching member, and a clamping member mounted upon the wheel attaching member and adapted to engage the hub flange of a spare wheel when the wheel attaching member is applied to the attaching bar, said clamping member being adapted to occupy the hub opening of an ordinary spare wheel such as used on automobiles.

7. An attaching device for spare wheels of automobiles, comprising an attaching bar formed with a lateral jaw at its inner end to engage a rod affixed to an automobile, a sleeve-like casing member fitted over the attaching bar and formed with notched portions to receive said rod and bear thereagainst, a wheel attaching bolt screwed into the outer portion of the locking bar and having a head adapted to receive thereover, a locking unit so as to prevent access thereto for manipulation thereof.

8. An attaching device for spare wheels of automobiles, comprising an attaching bar formed with a lateral jaw at its inner end to engage a rod affixed to an automobile, a sleeve-like casing member fitted over the attaching bar and formed with notched portions to receive said rod and bear thereaganist, a wheel attaching bolt screwed into the outer portion of the attaching bar and having a head adapted to receive thereover, an attaching unit for preventing access thereto for manipulation thereof, and means for inter-engaging the sleeve-like casing with the attaching bar so as to prevent accidental displacement of the casing from the bar when the wheel attaching bolt has been removed.

9. An attaching device for spare wheels of automobiles, comprising an attaching bar to engage a rod fixed to the automobile, a casing member enclosing said attaching bar, a spare wheel attaching member inter-engaging the attaching bar and comprising a head by which it may be removed and attached, and adapted to receive thereover a lock unit after the attaching member has fastened the wheel to the attaching bar, for controlling access to the head of the attaching member, the said casing member for the attaching bar being provided with means for inter-engaging the casing member and bar so as to prevent accidental displacement of the casing from the bar when the wheel attaching member is removed.

10. An attaching device for spare wheels of automobiles, comprising an attaching bar formed with a lateral jaw at its inner end to engage a rod affixed to an automobile, a sleeve-like casing member fitted over the attaching bar and formed with notched portions to receive said rod and bear thereagainst, a wheel attaching bolt screwed into the outer portion of the locking bar and having a head adapted to receive thereover, a locking unit for preventing access thereto for manipulation thereof, and means for inter-engaging the sleeve-like casing with the attaching bar so as to prevent accidental displacement of the casing from the bar when the wheel attaching bolt has been removed, the instrumentality mentioned consisting of a friction lug cooperating between the sleeve-like casing member and the attaching bar, and a wheel clamping member mounted upon the wheel attaching bolt and adapted to occupy the opening in the hub flange of a spare wheel and to clamp against said hub flange.

11. An attaching device for spare wheels of automobiles, comprising an attaching bar to engage a rod fixed to the automobile, a casing member enclosing said attaching bar, and a spare wheel attaching member inter-engaging the attaching bar, and comprising a head by which it may be removed and attached, the rod engaging portion of the attaching bar being a jaw reinforced by the casing member which partly surrounds the jaw.

12. An attaching device for spare wheels of automobiles, comprising an attaching bar to engage a rod fixed to the automobile, a casing member enclosing said attaching bar, a spare wheel attaching member inter-engaging the attaching bar and comprising a head by which it may be removed and attached, and a clamping member mounted upon the wheel attaching member and adapted to engage the hub flange of a spare wheel when the wheel attaching member is applied to the attaching bar, said clamping member being adapted to occupy the hub opening of an ordinary spare wheel such as used on automobiles.

13. An attaching device for spare wheels of automobiles, comprising an attaching bar to engage a rod fixed to the automobile, a casing member enclosing said attaching bar, a spare wheel attaching member inter-engaging the attaching bar and comprising a head by which it may be removed and attached, and a wheel clamping member held in place against the wheel and closing the hub opening thereof, and carried by the attaching member.

In testimony whereof I affix my signature.

SOLOMON WISE.